United States Patent [19]

Chaconas et al.

[11] 4,280,776
[45] Jul. 28, 1981

[54] APPARATUS FOR INSTALLATION OF A DOOR LOCKSET

[75] Inventors: Peter C. Chaconas, Silver Spring; Richard A. Schafebook, Lutherville, both of Md.

[73] Assignee: Black & Decker Inc., Newark, Del.

[21] Appl. No.: 18,383

[22] Filed: Mar. 7, 1979

[51] Int. Cl.³ .............................................. B23B 49/00
[52] U.S. Cl. .............................. 408/72 R; 408/115 R; 408/241 B
[58] Field of Search ............... 408/72 R, 72 B, 115 R, 408/115 B, 241 B; 33/189

[56] References Cited

U.S. PATENT DOCUMENTS

| 2,605,791 | 8/1952 | Zern | 408/115 X |
| 3,381,551 | 5/1968 | Lavering et al. | 408/72 |
| 4,176,989 | 12/1979 | Wolff | 408/115 R |

FOREIGN PATENT DOCUMENTS 2240799  3/1975  France ...................................... 408/115

Primary Examiner—Z. R. Bilinsky

Attorney, Agent, or Firm—Harold Weinstein; Leonard Bloom; Edward D. Murphy

[57] ABSTRACT

The apparatus includes a drill guide for use during the installation of locksets in doors. The guide has a body with preferably two recesses formed on the flat faces of opposite sides of the guide. One of the recesses has a flat base for straight-edged doors and the other has a sloped base for beveled-edged doors. An aperture extends through the body from recess to recess and is centered relative to the recesses so that the flat face serves as a guide for drilling pilot holes on the face of the door, while the recesses selectively serve as self-centerable guides for drilling pilot holes for either straight- or beveled-edged doors. A drift punch can be inserted into the edge pilot hole after the face hole has been made so that upon closing the door and urging the drift punch into the jamb, a mark will be made which is the center of the strike hole. The present guide is also usable in an improved method of installing locksets in doors by marking the center of the lockset location, placing the guide at the mark to drill a pilot hole, drilling a face and edge hole by using the pilot hole, and thereafter attaching the lockset.

11 Claims, 21 Drawing Figures

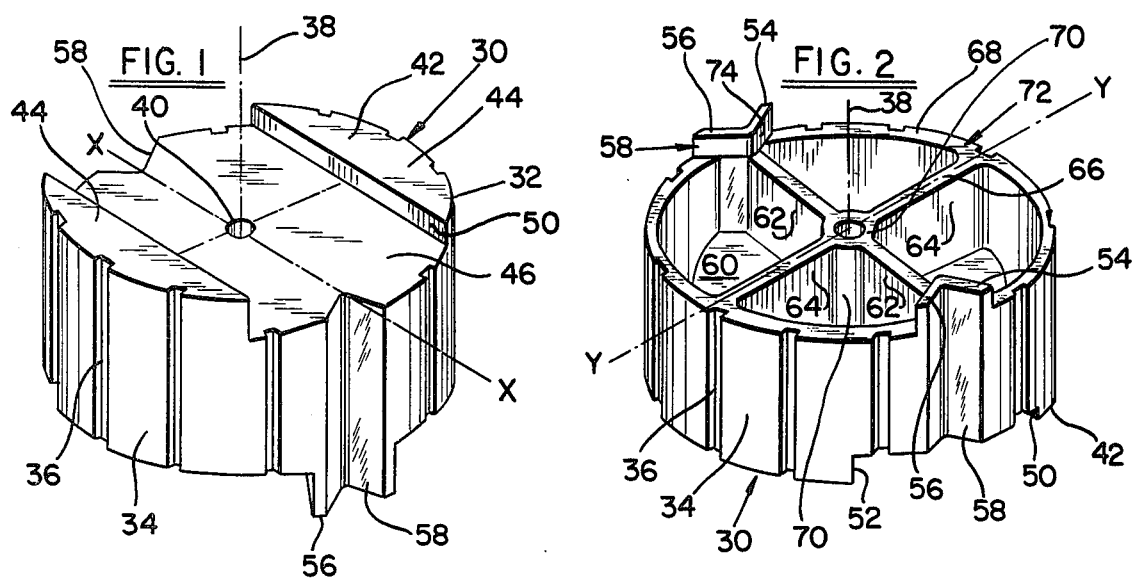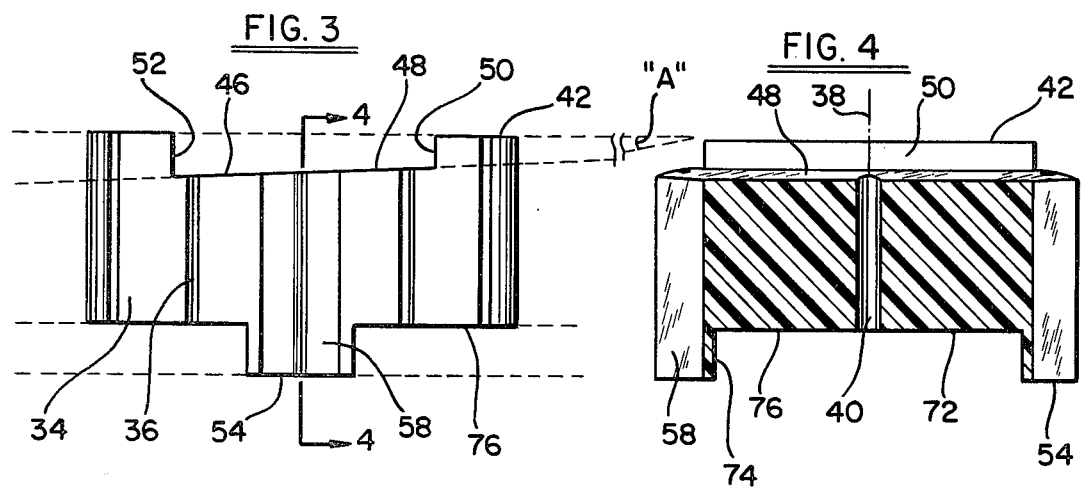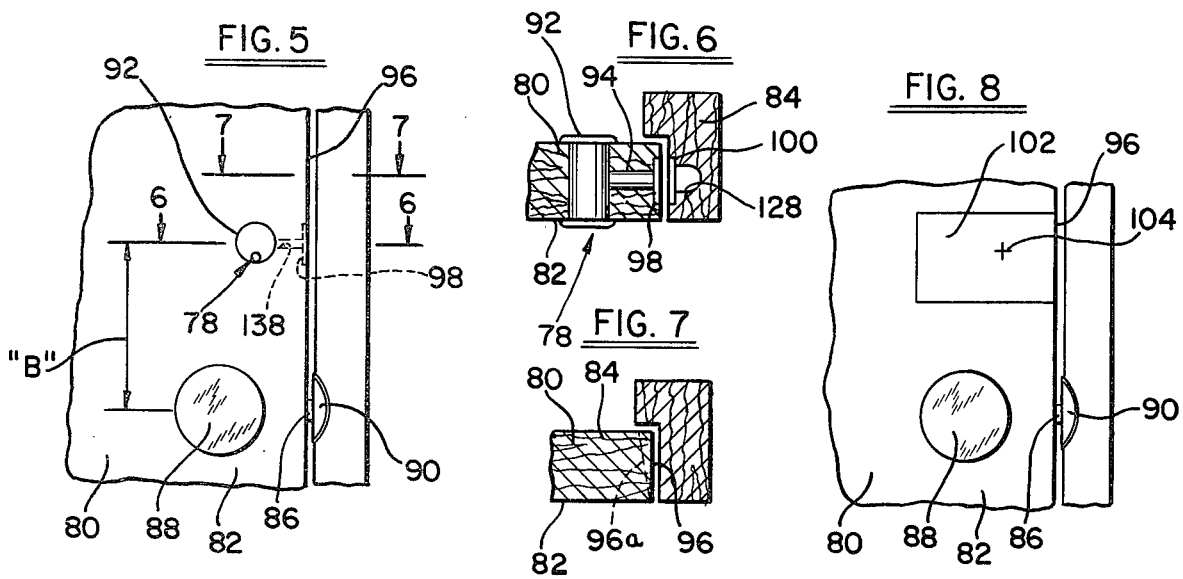

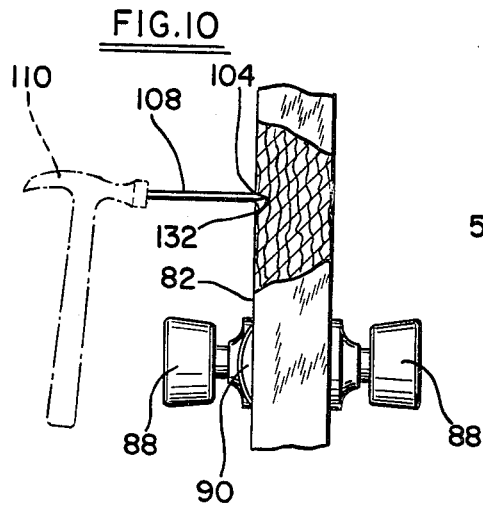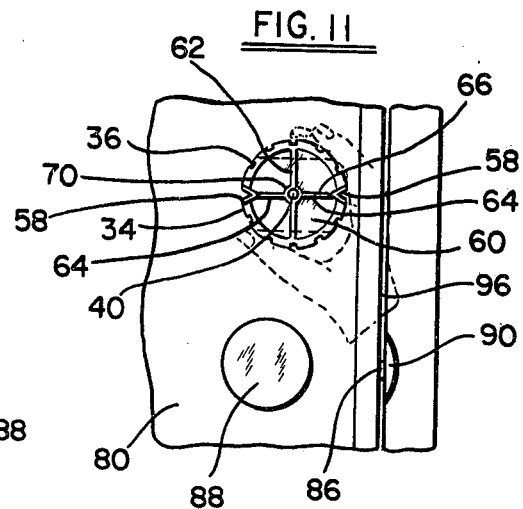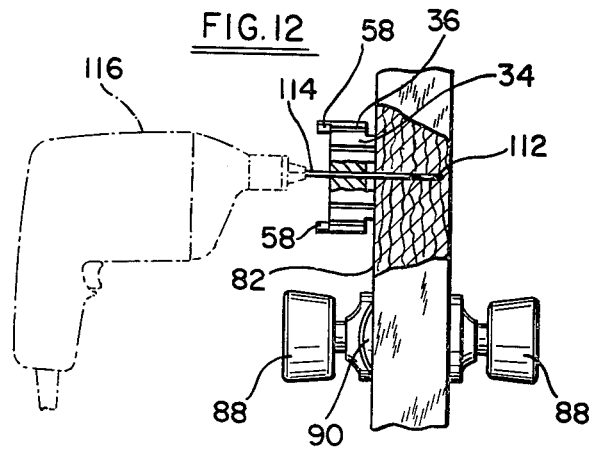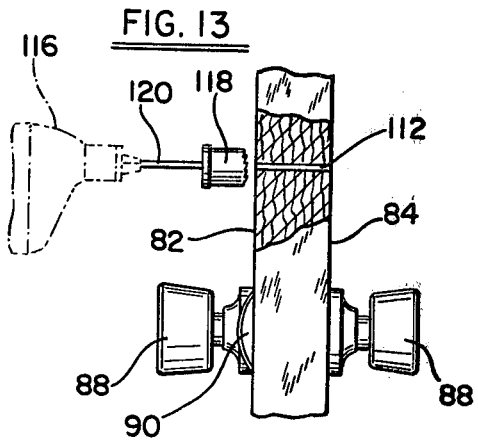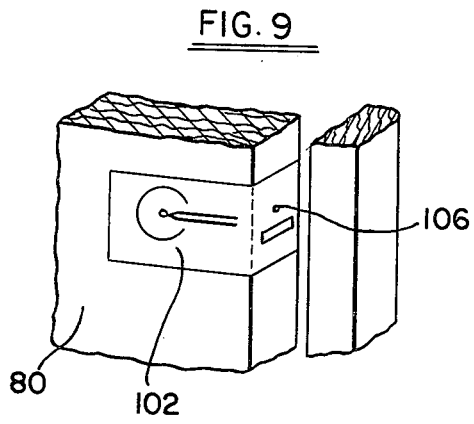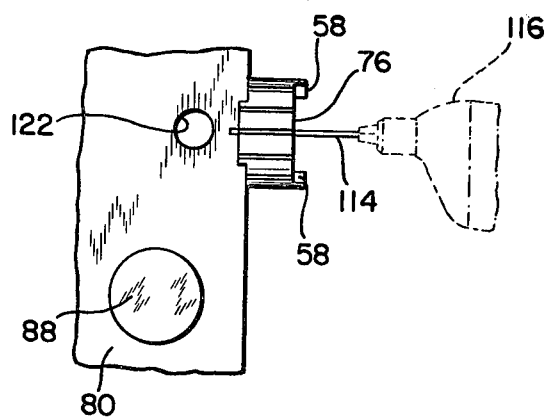

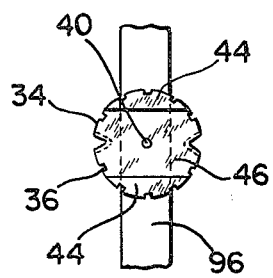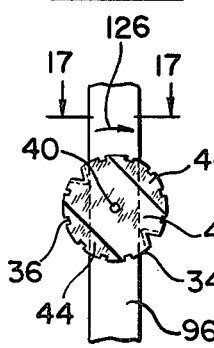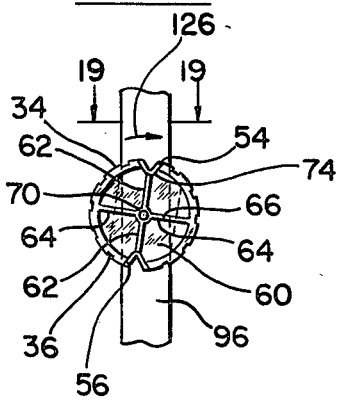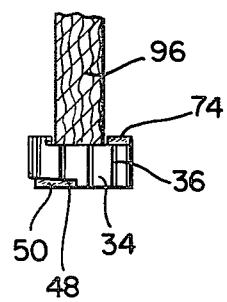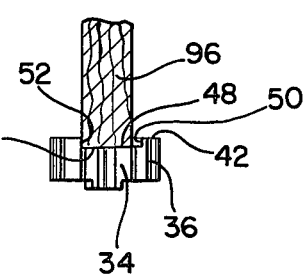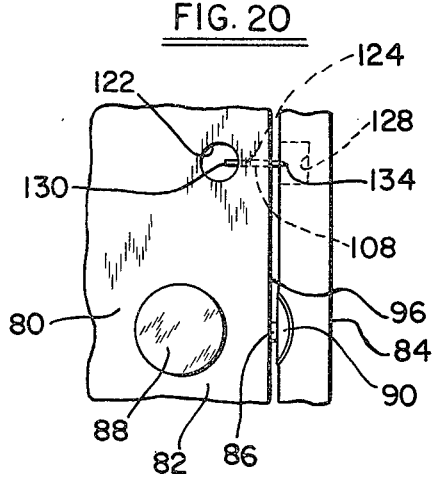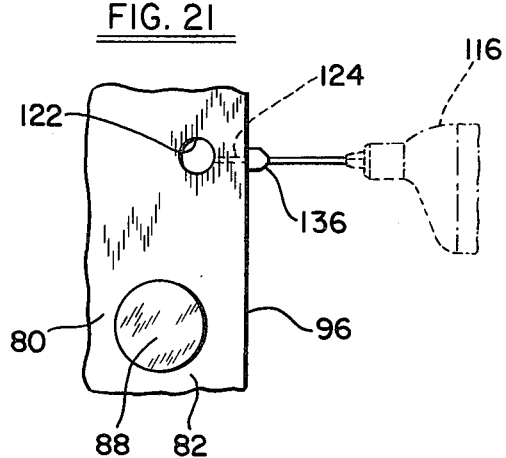

APPARATUS FOR INSTALLATION OF A DOOR LOCKSET

BACKGROUND OF THE INVENTION

Heretofore the installation of locksets into doors has been accomplished through the use of rough estimation of operator measurements, such as a reference measurement from the floor relative to the face, the edge and the jamb of the door. If a drill guide were available, it would have been the common type used for drilling a single hole and, therefore, not readily adaptable for use in the installation of a lockset.

SUMMARY OF THE INVENTION

It is an object of the present invention to provide an improved apparatus and method for the installation of door locksets which overcomes the prior art disadvantages; which is simple, economical and reliable; which uses a drill guide for drilling pilot holes; which drill guide has a plurality of surfaces, one of which is selectively and individually used in coordination with an aperture for drilling pilot holes; which drilling guide has oppositely-formed flat faces each of which is recessed, one for a straight edge and the other for a beveled edge of the door; the guide recesses are wider than the edge of the conventional door whereby on turning of the guide the aperture will be self-centered upon the pilot hole mark; one recess of the guide is formed along an X—X quadrant line while the other is formed along a Y—Y quadrant line; upon turning of the drill guide body the aperture will be self-centered upon the mark for drilling pilot holes at the edge of the door; the method of which includes using the drilling guide to form pilot holes during the installation of the lockset; and which has a drift punch and subsequent to forming the face hole and the edge pilot hole in the door the drift punch will be inserted into the edge pilot hole so that upon closing of the door and extending the drift punch a center mark for the strike plate in the jamb will be formed.

Other objects and advantages will be apparent from the following description of the invention, and the novel features will be particularly pointed out hereinafter in the claims.

BRIEF DESCRIPTION OF THE DRAWINGS

This invention is illustrated in the accompanying drawings in which:

FIG. 1 is a perspective view of the novel drill guide of the present invention showing the flat face thereof with the recess having the sloped base.

FIG. 2 is a perspective view of the improved drill guide of FIG. 1 showing the opposite face thereof which has a recess whose base is parallel to the face.

FIG. 3 is a front elevational view of FIG. 1.

FIG. 4 is a sectional view taken along line 4—4 of FIG. 3.

FIG. 5 is a segmental elevational view of a door and jamb frame showing the lockset.

FIG. 6 is a sectional view taken along line 6—6 of FIG. 5 showing the lockset.

FIG. 7 is a sectional view taken along line 7—7 of FIG. 5 showing the door and jamb showing the straight edge of the door in solid-line representation and the beveled edge of the door in dashed-line representation.

FIG. 8 is a segmental elevational view of a door and frame showing a template in position and ready for center punching.

FIG. 9 is a perspective segmental view of the door and frame showing the template in position preparatory to marking the position for the pilot holes upon the face and edge of the door.

FIG. 10 is a side elevational view partly in section of a door edge showing the center punch being applied to the face.

FIG. 11 is a front elevational segmental view of the door and frame showing the drill guide positioned for pilot hole drilling at the face.

FIG. 12 is a side elevational view partly in section of the door edge and drill guide showing the pilot hole being drilled in the face.

FIG. 13 is a side elevational view partly in section showing a hole saw about to cut the face hole using the pilot hole as a guide.

FIG. 14 is a front segmental elevational view of the door in the open position with the drill guide positioned at the edge of the door for pilot hole drilling.

FIG. 15 is a partial edge elevational view of FIG. 14 showing the drilling guide initially positioned for pilot hole drilling.

FIG. 16 is a partial edge elevational view for a straight-edged door similar to FIG. 15 and showing the drill guide in rotated position to provide a clamping engagement with the front and back faces of the door to self-center the aperture at the marked position prior to drilling of the pilot hole.

FIG. 17 is a plane view taken along line 17—17 of FIG. 16.

FIG. 18 is a partial edge elevational view of a beveled-edged door similar to FIG. 15 and showing the guide positioned prior to drilling the pilot hole.

FIG. 19 is a plane view taken along line 19—19 of FIG. 18.

FIG. 20 is a segmental elevational view of the door and frame showing the center punch which has been inserted through the edge pilot hole to extend into the face hole wherein it will be pressed outwardly toward the jamb to make a center mark in the jamb for subsequent use in the installation of the strike or keeper plate.

FIG. 21 is a front segmental elevational view of the door showing a spade bit aligned with the edge pilot hole and ready to bore the bolt aperature.

DESCRIPTION OF THE INVENTION

In the illustrated embodiment of the invention, a novel drill guide 30 is shown in FIGS. 1 through 4 as having a body 32 with a circular periphery 34 which has circumferentially spaced vertical depressions or slots 36 disposed parallel to a central axis 38 of the drill guide 30.

A central aperture 40 is coincident with the axis 38 and has hypothetical X—X and Y—Y quadrant lines extending therethrough. A flat face 42 having two semi-circular face positions 44 formed on opposite sides of a recess 46 having a sloped base 48 formed at a predetermined angle "A" to the plane of the flat face 42 so that the side 50 shown in FIGS. 1 and 3 is shorter than the opposed side 52, which sides extend upwardly from the base 48 to terminate at the flat face 42. A flat face 54 is formed on the opposite side of the first flat face 42, which flat face 54 lies in a plane parallel to that of the first flat face 42 and each of the faces 42 and 54 are substantially perpendicular to the axis 38. The flat face 54 is defined by the upper surface 56 of two "V" projections 58, 58 formed on opposite sides of the periphery 34 whereby their inwardly extending center portions lie along the X—X quadrant line as shown in FIG. 2. The inside of the drill guide is hollow as at 60 and has interconnecting webs 62, 62 extending along the X—X quadrant line on either side of the aperture 40, and webs 64, 64 extending along the Y—Y quadrant line on either side of the aperture 40. The webs extend through the hollow 60 from the underside of the base 48 and each terminate in a flat surface 66 which extends coextensively with the flat circular surface 68 bounding the periphery 34. A central wall 70 encircles the aperture 40 and is contacted by each of the webs 62 and 64. The flat surfaces 66 and 68 define a base 72 of a recess having short side walls 74 formed at the inner points of the "V" projections 58. The base 72 and the side walls 74 coact to define a recess 76 whose base 72 is parallel to the plane in which the flat face 54 lies. The recesses 46 and 76 are 90° out of phase with each other so that the longitudinal line of the recess 46 lies along the X—X quadrant line, while the longitudinal line of the recess 76 lies along the Y—Y quadrant line. The axis 38 and, consequently, the aperture 40 are equidistant from the corresponding sides 50, 52 and 58, 58 of the respective recesses 46 and 76.

A lockset 78 is shown in FIGS. 5 and 6 as having been installed in a door 80 having a face 82 which faces the viewer in FIG. 5, and a frame or jamb 84 against which the door will close to be latched by the latch 86 and/or locked by the lockset 78. Turning of a knob 88 will release the latch 86 from the keeper 90 to permit opening of the door 80 in a conventional manner. The lockset 78 is shown installed above the knob by a predetermined distance nominally characterized as "B" which may be measured from either the knob or the floor. The lockset 78 includes a lock cylinder 92 in which a key (not shown) will be inserted and turned to selectively extend or retract a latch or dead bolt 94 which bolt extends beyond the edge 96 of the door 80 in association with a latch plate 98 affixed to the edge 96 to be operatively engaged within a strike plate or keeper 100 affixed at the strike hole 128 whereby the door 80 will be either locked or unlocked.

The edge 96 may be either straight as shown by the solid-line representation of FIG. 7 or it may be beveled as at 96a as shown by the dashed-line representation of FIG. 7.

In installing a lockset 78 at the prescribed distance "B" a template 102 illustrated in FIGS. 8 and 9 may be used wherein a center mark for the face as at 104 and the edge as at 106 is indicated in accordance with the particular lockset 78 which dimensions may be specified or made in accordance with the dimensions specified by the manufacturer of such locksets. The template 102 may be hand-held or taped at the desired location so that a drift punch 108 can be used to mark the points 104 and 106 upon being tapped by a suitable tool such as a hammer 110 shown in the dotted line representation of FIG. 10. Once the marks 104 and 106 have been made the template 102 is removed.

In order to assure proper operation of the lockset 78 and to facilitate installation thereof a high degree of accuracy is necessary so that the centers of the respective marks intersect each other to improve the accuracy of the subsequent drilling or hole cutting operations. To this end, the drill guide will have its flat face 42 placed in superpositions to the mark 104, as shown in FIG. 11 engaging the face 82 of the door 80 to place the aperture 40 in superposition to the mark 104.

While holding the drill guide 30 in the position depicted in FIGS. 11 and 12 a pilot hole 112 will be drilled by a suitable drill bit 114 powered from a drill 116 shown in dotted-line representation of FIG. 12 by extending the drill bit 114 through the aperture 40 of the drill guide 30. The pilot hole 112 as illustrated in FIG. 13 extends through the thickness of the door 80 from its face 82 to the back 84 thereof.

A hole saw 118 mounted upon a mandrel 120 to be powered by a drill 116 will next cut a face hole 122 which is shown in FIG. 14 by the mandrel 120 being guided and kept in alignment within the pilot hole 112 to permit the hole saw 118 to produce an accurate cut of the face hole 112 at the desired location.

The edge pilot hole 124 shown drilled in FIG. 21 extends from the edge 96 through to intersect the midpoint of the face hole 122. In order to accurately locate the edge pilot hole 124, it is necessary to place one of the recesses 46 or 76 with its respective bases 48 or 72 into engagement with the corresponding edge 96a or 96 of the door 80 as a first step as is shown in FIGS. 14 and 15. If the door 80 has a straight edge 96 as is shown in FIGS. 16 and 17 the flat face 72 of recess 76 will engage the edge 96 with the aperature 40 being placed in superposition to the center mark 106, and then with the operator holding the periphery 34 and rotating the guide 30 in either direction with a clock-wise rotation indicated in FIG. 16 by the arrow 126 so as to cause the sides 74, 74 to engage the face 82 and back 84 respectively of the door 80 to clamp the guide 30 in a self-centered position upon the edge 96 prior to the pilot hole 124 being drilled with the bit 114 as is illustrated in FIG. 14.

In the event that the door 80 has a beveled edge 96a the drill guide 30 will be positioned as shown in FIGS. 18 and 19 whereby the sloped base 48 will be placed upon the edge 96a with the slope corresponding to that of the edge so that the sides of the recess 46 extend beyond the edge and over the face 82 and back 84 respectively. The thickness of the door in most cases will be less than the width of the respective recesses 46 and 76 so as to require the rotation or turning action of the drill guide 30 in order to locate the same in position. As shown in FIGS. 18 and 19 with the beveled edge 96a the sides 50 and 52 will engage the back 84 and face 82 respectively of the door 80 to thus lock the drill guide 30 in desired position prior to accomplishing the drilling of the edge pilot hole 124 through the use of the bit 114 as shown in FIG. 14.

Not only is it important to properly align the face pilot hole 112 and the edge pilot hole 124 but also the location of the strike hole 128 shown in FIGS. 6 and 20. This may be readily accomplished as shown in FIG. 20 by the cooperative action of the face hole 122, the edge pilot hole 124 and the drift punch 108. The drift punch 108 will be inserted with its blunt edge 130 passing through the pilot hole 124 to enter into the face hole 122 a sufficient distance to permit the door 80 to be placed in its closed position. Thereafter, the blunt edge 130 of the drift punch 108 will be tapped or otherwise shifted outwardly to urge the pointed end 132 of the drift punch 108 into engagement with the jamb 84 to make a center mark 134 in the adjacent side of the said jamb. Once the jamb is marked at 134 the drift punch 108 will be manually moved into the face hole 122 to permit the door 80 to be opened and the drift punch 108 to be removed. This will permit subsequent formation of the strike hole 128 and connection of the strike plate 100.

A spade bit 136 guided by the pilot hole 124 will have its tip powered by the drill 116 to cut a suitable hole for the latch or dead bolt 94 as is illustrated in FIG. 21 wherein the hole will extend from the edge 96 to intersect in aligned position within the face hole 122, which hole is shown in dotted-line representation at 138 of FIG. 5.

Of course, the manual operations and tools therefor, such as a chisel or the like, for the usual cutting and fitting of the various components of the lockset 78 do not form a part of the present invention and, therefore, have not been described herein, but may be used by the operator in connecting the lockset 78 in the door 80.

It will be understood that various changes in the details, materials, arrangements of parts and operating conditions which have been herein described and illustrated in order to explain the nature of the invention may be made by those skilled in the art within the principles and scope of the invention.

Having thus set forth the nature of the invention what is claimed herein is:

1. A guide for installing a lockset in a door having an edge comprising:
   (a) a body having a flat face lying in a plane,
   (b) a pair of recesses formed in the body,
   (c) one of the recesses located in the flat face, having a width normally greater than the thickness of the door edge, and having a flat base and at least one side,
   (d) the flat base being substantially parallel to the flat face,
   (e) the other recess having a sloped base formed at a predetermined angle with respect to the flat face,
   (f) an aperture extending longitudinally through the body to define a pilot hole guide, and
   (g) the aperture formed perpendicular to the flat face.

2. The combination claimed in claim 1 wherein:
   (a) the pair of recesses formed on opposite sides of the guide,
   (b) one of the recesses formed along the X—X quadrant line, and
   (c) the other of the recesses formed along the Y—Y quadrant line.

3. A guide for installing locksets in doors comprising:
   (a) a body having flat faces formed on opposite sides thereof,
   (b) a recess formed in each of the flat faces to extend toward each other and the recesses defining a first recess and a second recess,
   (c) the first recess has a base parallel to the flat face,
   (d) the second recess has a base sloped relative to the flat face corresponding to a normally beveled door edge,
   (e) each of the recesses having at least one side extending from the base to the flat face, and
   (f) an aperture extending through the body from recess to recess whereby the guide may be used to drill pilot holes in the door.

4. The combination claimed in claim 3 wherein the first recess is wider than the second recess.

5. The combination claimed in claim 4 wherein each of the recess widths is formed normally larger than the thickness of the door edge.

6. The combination claimed in claim 3 wherein:
   (a) the body has a circular periphery, and
   (b) slots are formed on the periphery to increase the friction for holding the guide.

7. The combination claimed in claim 6 wherein:
   (a) the aperture is centered in the guide, and
   (b) a pair of "V" grooves are formed diametrically opposite each other with the open end terminating at the periphery and having a diametrical line pass through the grooves and the aperture.

8. The combination claimed in claim 7 wherein:
   (a) projections extend from the "V" grooves beyond the recess in a direction of one of the flat faces to terminate therein, and
   (b) the projections have edges which define sides of the recess.

9. The combination claimed in claim 8 wherein:
   (a) the recess at the projection side having a flat base, and
   (b) the recess at the nonprojection side having a sloped base.

10. The combination claimed in claim 8 wherein:
    (a) the recess at the projection side being wider than the recess at the nonprojection side.

11. A guide for installing locksets in a door having an edge comprising:
    (a) a body having a flat face lying in a plane,
    (b) a recess having a width normally greater than the thickness of the door edge formed in the flat face,
    (c) the recess having a base and two parallel sides formed coincident with opposite facing walls of the recess,
    (d) the base being sloped at a predetermined angle with respect to the flat face of the guide,
    (e) the midpoint of the recess coinciding with the midpoint of the flat face,
    (f) an aperture extending longitudinally through the body to define a pilot hole guide, and
    (g) the aperture formed perpendicular to the midpoint of the flat face whereby upon the recess being placed over the door edge, the guide is adapted to be rotated to engage diametrically opposed ends of the two parallel sides to center the pilot hole guide upon the door edge.

* * * * *